(12) United States Patent  (10) Patent No.: US 7,736,111 B2
De Azevedo et al.  (45) Date of Patent: Jun. 15, 2010

(54) DEVICE FOR HOLDING SCREW-LIKE MEANS IN POSITION

(75) Inventors: Helder De Azevedo, Sainville (FR); Dominique Dubost, Le Celle St Cloud (FR)

(73) Assignee: ATTAX, Paris (FR)

( * ) Notice: Subject to any disclaimer, the term of this patent is extended or adjusted under 35 U.S.C. 154(b) by 23 days.

(21) Appl. No.: 11/401,876

(22) Filed: Apr. 12, 2006

(65) Prior Publication Data

US 2006/0251491 A1 Nov. 9, 2006

(30) Foreign Application Priority Data

Apr. 13, 2005 (FR) .................... 05 03699

(51) Int. Cl.
*F16B 37/02* (2006.01)

(52) U.S. Cl. .................. 411/520; 411/112; 411/172; 411/970; 411/999

(58) Field of Classification Search .................. 411/999, 411/520, 525, 112, 111, 970, 172, 173, 352, 411/353
See application file for complete search history.

(56) References Cited

U.S. PATENT DOCUMENTS

| 1,047,727 | A | * | 12/1912 | Anschutz ...................... 138/89 |
| 1,694,580 | A |   | 12/1928 | Carr |
| 1,928,468 | A | * | 9/1933  | Tinnerman ................... 411/174 |
| 2,213,924 | A | * | 9/1940  | Tinnerman ..................... 403/21 |
| 2,390,752 | A | * | 12/1945 | Tinnerman ................... 411/112 |
| 2,406,415 | A |   | 8/1946  | Tinnerman |
| 2,571,786 | A | * | 10/1951 | Tinnerman ................... 411/112 |
| 2,632,929 | A | * | 3/1953  | Poupitch ....................... 24/290 |
| 2,727,552 | A | * | 12/1955 | Chvesta ....................... 411/112 |
| 2,916,114 | A | * | 12/1959 | Flora ........................... 403/404 |
| 2,936,502 | A | * | 5/1960  | Newcomer, Jr. ............. 411/549 |
| 3,362,278 | A | * | 1/1968  | Munse ......................... 411/437 |
| 3,398,496 | A | * | 8/1968  | Mischke ....................... 52/463 |
| 3,645,311 | A |   | 2/1972  | Tinnerman |
| 3,695,324 | A |   | 10/1972 | Gulistan |
| 4,167,648 | A | * | 9/1979  | Lockwood ................... 174/53 |
| 5,281,064 | A | * | 1/1994  | Zimmer ........................ 411/85 |
| 6,457,924 | B1 |  | 10/2002 | Wallace |
| 7,235,744 | B2 | * | 6/2007 | Zoller ..................... 174/138 G |

FOREIGN PATENT DOCUMENTS

FR 2 178 419 A 11/1973

* cited by examiner

*Primary Examiner*—Flemming Saether
(74) *Attorney, Agent, or Firm*—Sughrue Mion, PLLC

(57) ABSTRACT

This device for holding screw-like means (1) in position in a through-hole (2) in a first part (3) for clamping the first part to a second part is characterized in that it comprises a one-piece tongue (4) comprising a central portion provided with a tapped hole (5) for receiving screw-like means (1) and either side of which extend two resilient wings (6, 7) intended to engage with clearance in apertures (8, 9) in the first part to allow the screw-like means to be held in position with clearance in the hole (2) in this first part.

4 Claims, 1 Drawing Sheet

DEVICE FOR HOLDING SCREW-LIKE MEANS IN POSITION

BACKGROUND OF THE INVENTION

Field of the Invention

The present invention concerns a device for holding screw-like means in position.

More specifically, the invention relates to a device for holding screw-like means in position in a through-hole in a first part for clamping the first part to a second part.

Devices of this type may have numerous applications, for example in the field of the automotive industry, etc.

It is known that when two pieces have to be clamped together using a screw, for example, the screw should be engaged and held in position in a first stage before it is tightened.

However, this holding in position of the screw-like means, for example by a fitter, may, for various reasons (for example, owing to problems of accessibility), be extremely difficult.

In the prior art, devices have therefore been developed for holding members of this type, for example screws or nuts.

These members, known as transfer members, allow the screw or the nut to be locked in position in the corresponding hole in the first part.

The problem is that the screw, for example, is then locked in position and has great difficulty accommodating centering variations relative to the other part.

BRIEF SUMMARY OF THE INVENTION

The object of the invention is therefore to solve these problems.

The invention accordingly relates to a device for holding screw-like means in position in a through-hole in a first part for clamping the first part to a second part, wherein it comprises a one-piece tongue comprising a central portion provided with a tapped hole for receiving screw-like means and either side of which extend two resilient wings intended to engage with clearance in apertures in the first part to allow the screw-like means to be held in position with clearance in the hole in this first part.

According to other characteristics of the invention:
the tapped hole in the central portion of the tongue is provided in an embossment thereof;
the lateral wings of the tongue comprise bent portions;
the apertures in the first part are provided in a web portion thereof;
the lateral wings of the tongue are diametrically opposed; and
the tongue is produced by the cutting and deformation of a sheet metal blank.

DETAILED DESCRIPTION OF THE INVENTION

Figure 1:
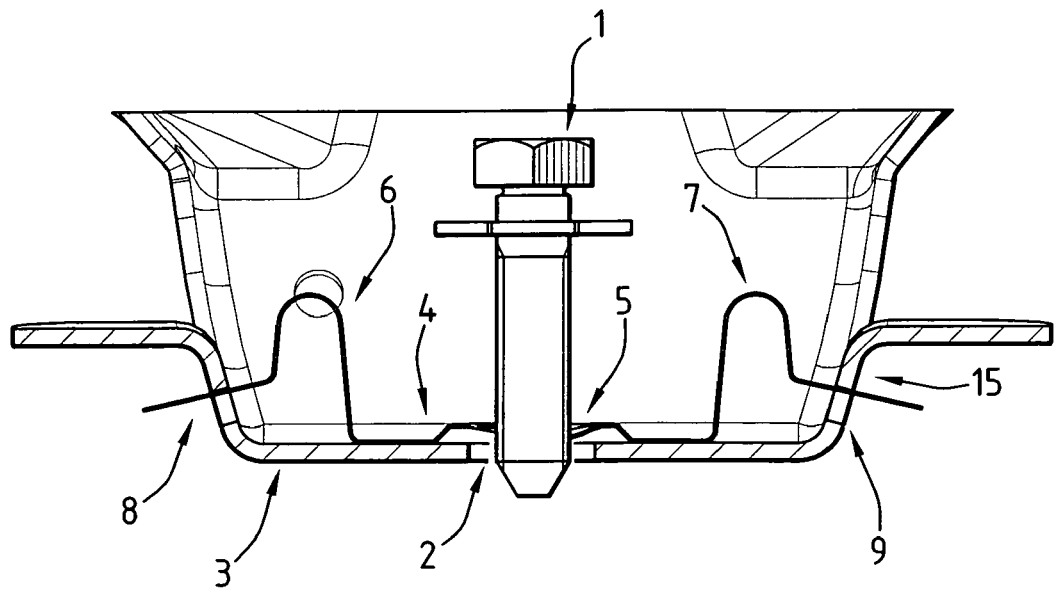
Figure 2:
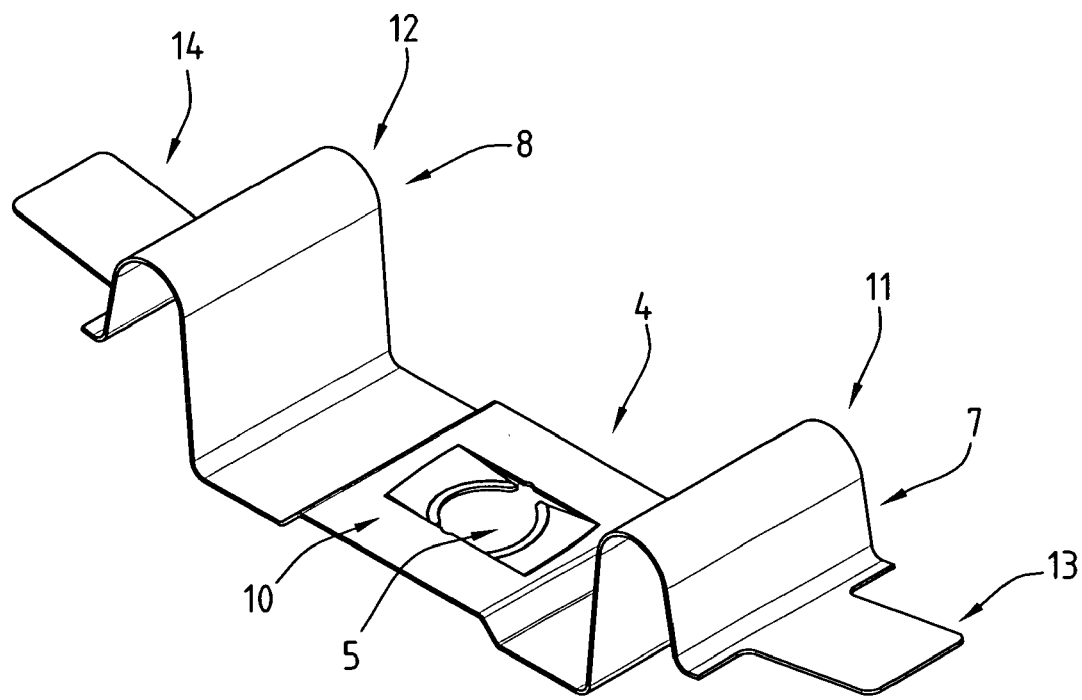

A better understanding of the invention will be facilitated by the following description, given solely by way of example and with reference to the accompanying drawings, in which:

FIG. 1 is a cross-section of a device for holding in position, mounted in a part and FIG. 2 is a perspective view of a tongue entering the construction of a device of this type.

These figures show a device for holding screw-like means, denoted for example by general reference numeral 1 in FIG. 1, in position in a through-hole, denoted for example by general reference numeral 2, in a first part, denoted by general reference numeral 3, intended to be clamped to a second part (not shown in this figure, FIG. 1).

In fact, as shown, this holding device comprises a tongue, denoted by general reference numeral 4, which is formed in one piece, for example by the cutting and deformation of a sheet metal blank.

This tongue 4 therefore comprises a central portion provided with a tapped hole, denoted by general reference numeral 5, for receiving screw-like means, either side of which extend resilient wings 6 and 7.

The ends of these resilient wings are intended to engage with clearance in corresponding apertures, for example 8 and 9, in the first part 3.

This then allows the screw-like means 1 to be held in position with clearance in the hole 2 in the first part, thus allowing the assembly formed by the screwing means and tongue to be displaced relative to this first part and to the through-hole therein, in order to accommodate any centring variation of the second part and, more specifically, of a nut or a tapped portion thereof.

Clearances between the pieces at X and Y may thus be accommodated when the pieces are assembled.

In the embodiment illustrated in these figures, and as is particularly apparent from FIG. 2, the tapped hole 5 in the tongue may be formed in an embossment 10 of the central portion of the tongue 4, while the resilient lateral wings 7, 8 of this tongue may each comprise a bent portion, denoted by general reference numerals 11 and 12 in FIG. 2, and an end portion of small cross-section, 13 and 14 respectively, allowing the wings to be introduced into the apertures 8 and 9 in the first part.

In the illustrated embodiment, the lateral wings are diametrically opposed and the apertures 8 and 9 in the first part may, for example, be formed in a web-like portion 15 thereof.

Other embodiments may, of course, also be envisaged.

The invention claimed is:

1. A device for holding a screw, comprising:
   a one-piece tongue having a central portion provided with a tapped hole for receiving the screw and having two resilient lateral wings; and
   a first part having apertures and a through-hole,
   wherein the two lateral wings extend from either side of said central portion and an end portion of one of the lateral wings extends in an opposite direction away from an end portion of another one of the lateral wings, the said end portions of both said lateral wings adapted to engage with the apertures to hold the screw in position with clearance in the through-hole in the first part,
   the lateral wings of the tongue comprise bent portions,
   the apertures in the first part are provided in a web portion thereof, and
   the central portion contacts a surface of the first part.

2. The holding device as claimed in claim 1, wherein the tapped hole in the central portion of the tongue is provided in an embossment thereof.

3. The holding device as claimed in claim 1, wherein the lateral wings of the tongue are diametrically opposed.

4. The holding device as claimed in claim 1, wherein the tongue is produced by the cutting and deformation of a sheet metal blank.

* * * * *